United States Patent [19]

Tsuchiya et al.

[11] 3,838,209

[45] Sept. 24, 1974

[54] SCANNING APPARATUS FOR A MATRIX DISPLAY PANEL

[75] Inventors: Mitsuharu Tsuchiya, Osaka; Teruo Sato, Kyoto; Hitoshi Takeda, Yamatokoriyama; Masami Yoshiyama, Osaka, all of Japan

[73] Assignee: Matsushita Electric Industrial Co. Ltd., Osaka, Japan

[22] Filed: June 5, 1973

[21] Appl. No.: 367,184

[30] Foreign Application Priority Data

| | | |
|---|---|---|
| June 8, 1972 | Japan | 47-57493 |
| June 20, 1972 | Japan | 47-62204 |
| June 20, 1972 | Japan | 47-62212 |
| Sept. 20, 1972 | Japan | 47-94771 |

[52] U.S. Cl. .......................... 178/7.3 D, 315/169 TV

[51] Int. Cl. .......................... H04n 5/70

[58] Field of Search ........... 178/7.3 D; 340/166 EL, 340/173 LS, 324 M; 315/169 TV; 250/220 M, 553

[56] References Cited

UNITED STATES PATENTS

| | | | |
|---|---|---|---|
| 3,021,387 | 2/1962 | Raichman | 178/7.3 D |
| 3,590,156 | 6/1971 | Easton | 178/7.5 D |

*Primary Examiner*—Robert L. Griffin
*Assistant Examiner*—George C. Stellar
*Attorney, Agent, or Firm*—Wenderoth, Lind & Ponack

[57] ABSTRACT

A scanning apparatus for a matrix display panel having a plurality of picture elements at the intersections of X- and Y-line conductors. The scanning apparatus has an X-line driving circuit, Y-line driving circuit, a video signal generator, a timing signal generator, a width control signal generator, a second switching circuit and an analog-to-digital converter. The Y-line driving circuit has a plurality of sets of first memory circuits, a set of second memory circuits, a set of first switching circuits, and a set of brightness control circuits. The scanning apparatus is capable of reproducing moving images having many steps of gray scale from coded video signals having relatively few bits by digital circuits and is also capable of finely controlling the brightness by the efficient use of a horizontal sweep retrace period of the video signals with simplified circuits.

5 Claims, 6 Drawing Figures

SCANNING APPARATUS FOR A MATRIX DISPLAY PANEL

BACKGROUND OF THE INVENTION

1. Field of the Invention

This invention relates to a scanning apparatus for a matrix display panel, and more particularly to a scanning apparatus capable of reproducing improved moving, half-tone images on a matrix display panel from video signals in coded form and having fewer bits than heretofore with simplified circuits, and also capable of increasing the brightness of the images.

2. Description of the Prior Art

Matrix panels which have a multiplicity of picture elements located in a matrix at the intersections of X(horizontal) and Y(vertical) line conductors are well known. In order to reproduce images on such panels from image information signals, scanning is necessary. In general, the scanning is carried out by selecting X- and Y-lines in a predetermined sequence and applying proper voltages between the selected X- and Y-lines. The brightness of the picture elements is modulated by varying the amplitude or width of the applied pulses in accordance with the image information signals. Line-by-line scanning using line memory means is generally employed instead of sequential element by element scanning in order to increase the brightness of the reproduced images.

It is desirable to construct a scanning apparatus capable of digitally controlling the brightness by a digital circuit in integrated circuit form for the purpose of ensuring stable operation and reducing the size of the device. One scanning apparatus including means for digitally controlling the brightness of the matrix panel is described in the applicant's copending application No. 153,946 filed on June 17, 1971 now U.S. Pat. No. 3,761,617.

The video signal must be in coded form and having many bits in order to reproduce the half-tone images with high-fidelity to the input video signal. When the video signals are is coded form with a large number of bits, the circuit becomes more complicated. This results in increasing the size and the power consumption of the scanning apparatus. Therefore, further improvements are necessary for reproducing improved half-tone images with high-fidelity to the input video signals and increasing the brightness of the matrix panel with simplified circuits.

SUMMARY OF THE INVENTION

It is, therefore, an object of this invention to provide an improved scanning apparatus for a matrix display panel capable of reproducing moving images having more steps of gray scale from coded video signals having fewer bits than heretofore by digital circuits.

It is another object of this invention to provide a scanning apparatus for a matrix display panel capable of finely controlling the brightness by the efficient use of a horizontal sweep retrace period of the video signal with simplified circuits.

The scanning apparatus for a matrix panel of this invention comprises an X-line driving circuit, a Y-line driving circuit, a video signal generator, a timing signal generator, an analog-to-digital converter, a width control signal generator and a second switching circuit. The Y-line driving circuit comprises a plurality of sets of first memory circuits for sequentially writing coded video signals for one horizontal line period, a set of second memory circuits for holding coded video signals which are supplied from one of said sets of first memory circuits, a set of first switching circuits for selecting one of said plurality of sets of first memory circuits, and a set of brightness control circuits for supplying Y-line driving pulses to Y-line conductors.

BRIEF DESCRIPTION OF THE FIGURES

More details of this present scanning apparatus and its features will become apparent upon consideration of the following description taken together with the accompanying drawings, in which.

DESCRIPTION OF THE PREFERRED EMBODIMENT

Figure 1:
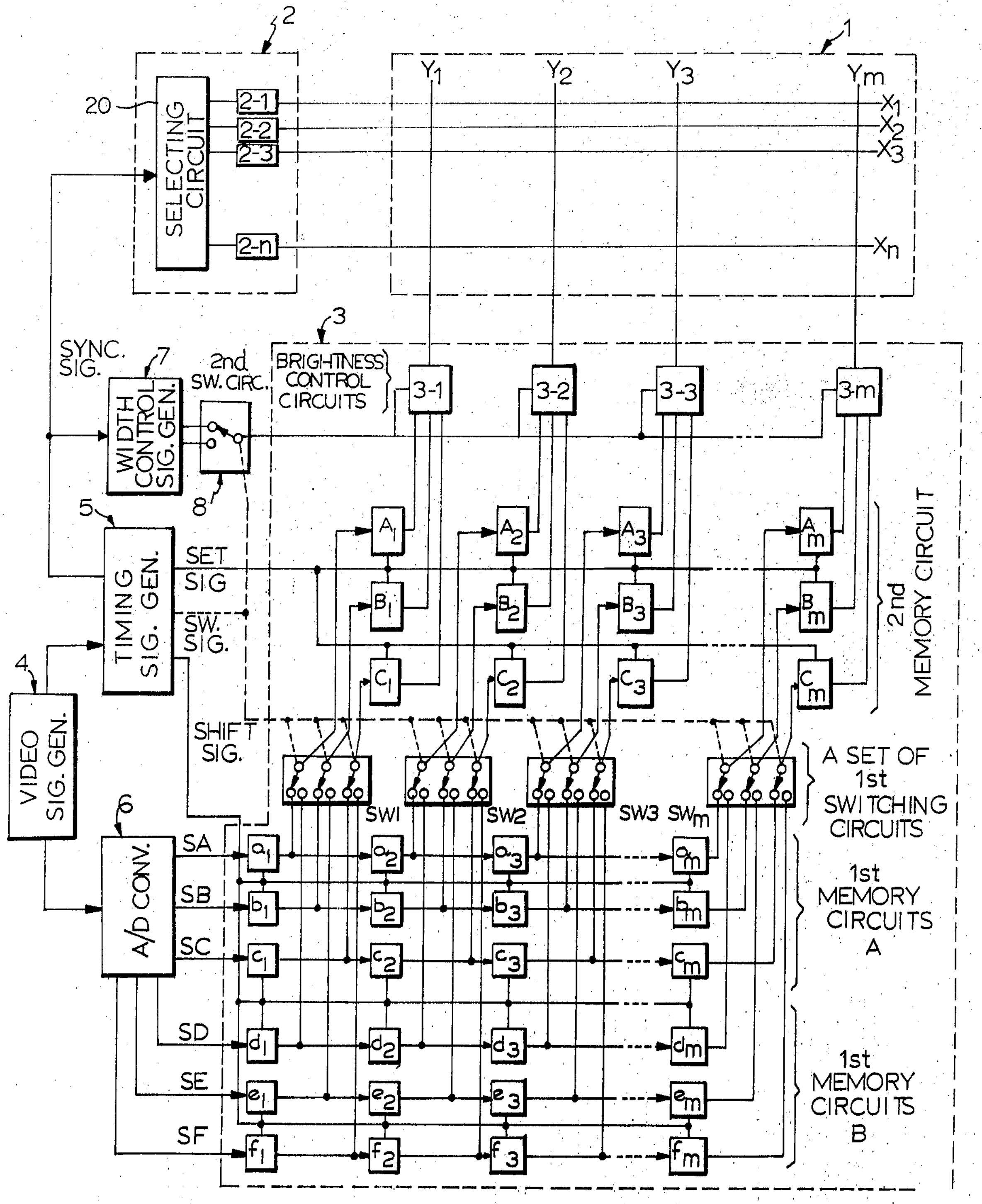
FIG. 1 is a block diagram of the scanning apparatus for a matrix panel according to this invention.

In FIG. 1, the scanning apparatus for a matrix panel 1 comprises an X-line driving circuit 2, a Y-line driving circuit 3, a video signal generator 4, a timing signal generator 5, an analog-to-digital converter 6, a width control signal generator 7 and a second switching circuit 8. The timing signal generator 5 supplies X-line driving circuit 2, Y-line driving circuit 3, and width control signal generator 7 with the timing signals such as vertical and horizontal synchronizing signals, set signals, shift signals and switching signals; as shown in FIG. 1.

The matrix panel 1 has a well-known crossed-grid structure, and has a multiplicity of picture elements in a matrix form at the intersections of X- and Y-line conductors $X_1, X_2 \ldots X_n$ and $Y_1, Y_2 \ldots Y_m$. As the matrix panel, e.g., electroluminescent panels, light-emitting diode arrays, and plasma display panels can be used for the scanning apparatus.

The well-known X-line driving circuit 2 comprises an X-line selecting circuit 20 and a set of pulse generators (2-1), (2-2), . . . (2-*n*).

The Y-line driving circuit 3 comprises two sets of first memory circuits A and B, a set of second memory circuits, a set of first switching circuits and a set of brightness control circuits composed of a plurality of AND gates and Y-line drivers.

The operation of the present scanning apparatus will be described in conjunction with FIG. 1, FIG. 2 and FIG. 3 for the case where 6-bit parallel-coded video signals converted from standard television signals are used as image information signals.

In the X-line scanning, the X-line conductors to be scanned are selected by the X-line selecting circuit 20 in predetermined sequence in response to horizontal synchronizing signals from the timing signal generator 5, and are supplied with X-line selecting pulses by the selected pulse generators.

In the Y-line scanning, video signals generated in the video signal generator 4 are supplied to the analog-to-digital converter 6, and are quantized to one of 64 quantizing levels, and are converted into 6-bit parallel-coded video signals (SA, SB, SC, SD, SE, SF) according to Table 1 in the analog-to-digital converter 6. A series of parallel-coded video signals corresponding to the Y-lines $Y_1, Y_2, \ldots Y_m$ are grouped into two parts, namely the 3-bit least significant signals (SA, SB, SC) and the 3-bit most significant signals (SD, SE, SF), and are written into sets A and B of first memory circuits, respectively, as shown in FIG. 1. Each of sets A and B of first memory circuits is composed of parallel 3-bit, serial $m$-bit shift registers made up of flip-flops $a_1, a_2, a_3 \ldots a_m, b_1, b_2, b_3 \ldots b_m$, etc. A coded video signal ($SA_j$, $SB_j$, $SC_j$, $SD_j$, $SE_j$, $SF_j$) is supplied to the first flip-flops ($a_1, b_1, c_1, d_1, e_1, f_1$) of the parallel 6-bit first memory circuits ($a_1, a_2 \ldots a_m$) ($b_1, b_2, \ldots b_m$) ($c_1, c_2, \ldots c_m$) ($d_1, d_2, \ldots d_m$) ($e_1, e_2, \ldots e_m$) ($f_1, f_2, \ldots f_m$), and is shifted to the next flip-flops ($a_2, b_2, c_2, d_2, e_2, f_2$) by a shift signal. As a series of shift signals is generated, the coded video signal ($SA_j$, $SB_j$, $SC_j$, $SD_j$, $SE_j$, $SF_j$) is written sequentially into sets A and B of the first memory circuits and is shifted in turn by the shift signal from left to right in the first memory circuits.

When the writing of the coded video signals for one horizontal line period ($t_x$) into the sets A and B of the first memory circuits by a series of shift signals is completed, the set of first switching circuits ($SW_1, SW_2, \ldots SW_m$) are simultaneously switched to the left terminals as shown in FIG. 1. Then the first set signal is generated in the timing signal generator 5 as shown in FIG. 3, and is supplied to the set of second memory circuits. As a result, 3-bit least significant signals ($SA_j$, $SB_j$, $SC_j$) written into the A set of first memory circuits ($a_1, b_1, c_1, a_2, b_2, c_2, \ldots a_m, b_m, c_m$) are simultaneously transferred to the corresponding second memory circuits ($C_1, A_2, B_2, C_2 \ldots A_m, B_m, C_m$), being held there until the next set signal arrives, and are supplied to the corresponding brightness control circuit ($3_1, 3_2 \ldots 3_m$).

Figure 2:
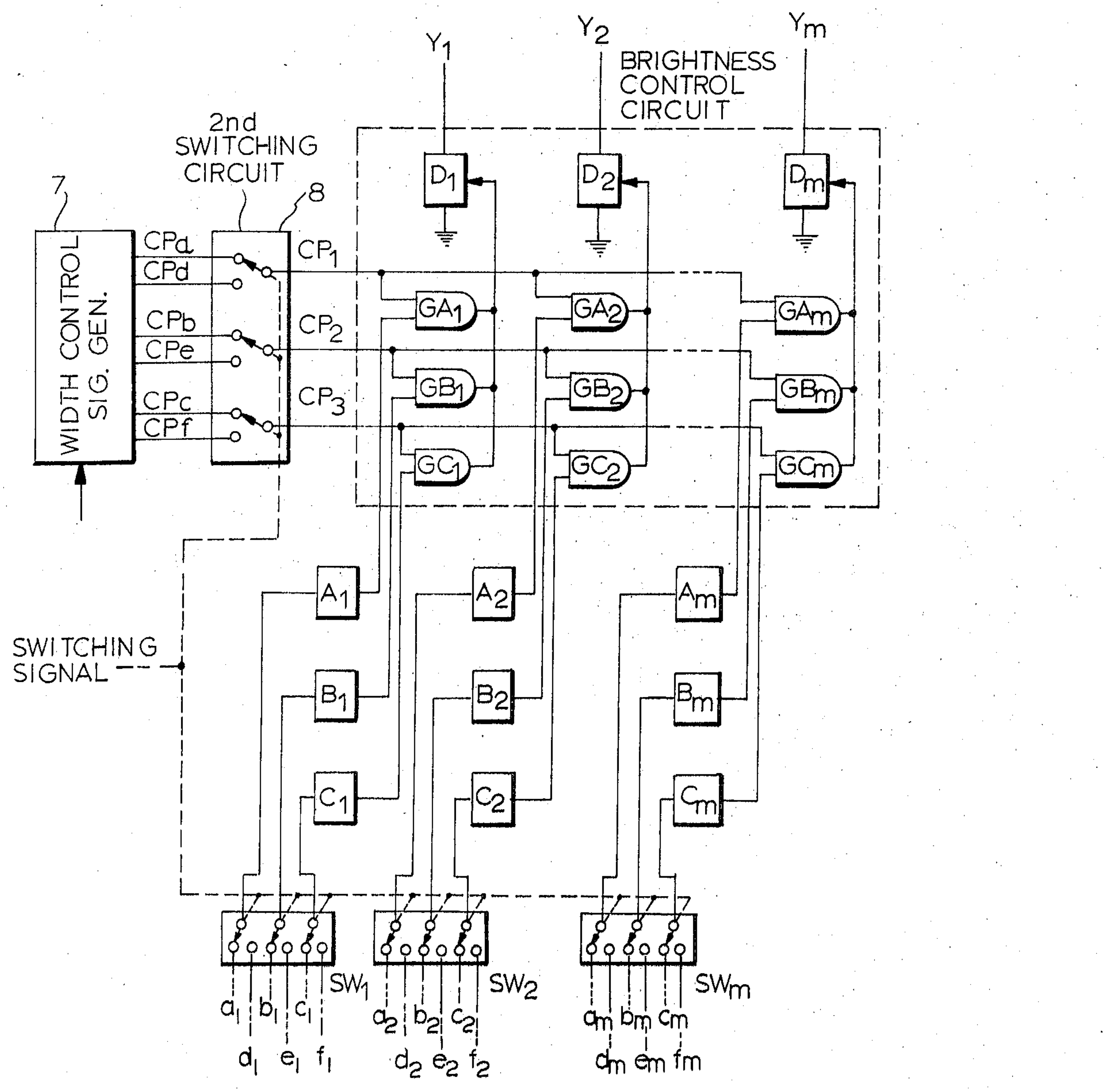
FIG. 2 is a circuit diagram of a set of brightness control circuits, a second switching circuit, and their associated circuits.

The second switching circuit is switched to the upper terminal in synchronization with the switching signal from the timing signal generator 5, and is held in this state during the first brightness control period ($t_R$) as shown in FIG. 1 and FIG. 2.

Figure 3:
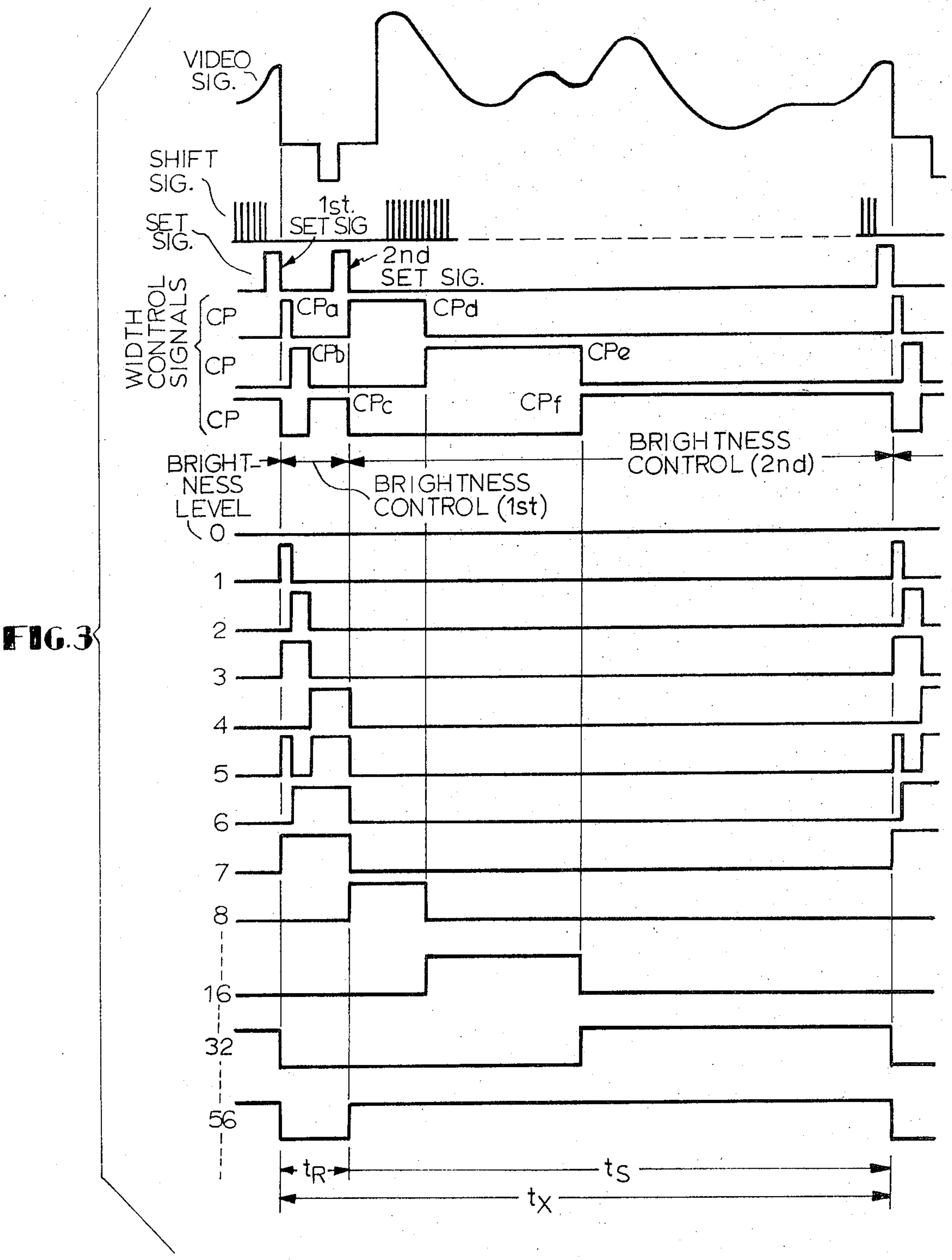
FIG. 3 is a chart showing the relationship, in time, of the shift signal, set signal, and width control signals, and showing the relation between brightness levels and width control signals in the scanning apparatus shown in FIG. 1.

The first width control signals ($CP_a$, $CP_b$, $CP_c$), which are generated sequentially during the first brightness control period ($t_R$) in the width control signal generator 7, are not time coincident with each other and also have different pulse-widths from each other in a relation of e.g., 1:2:4 as shown in FIG. 3. The first width control signals ($CP_a$, $CP_b$, $CP_c$) are supplied to the set of brightness control circuits $3_1, 3_2 \ldots 3_m$ through the lines ($CP_1$, $CP_2$, $CP_3$) as shown in FIG. 2.

In the set of brightness control circuits, the brightness control signals are synthesized by the AND function of the AND gates ($GA_1$, $GB_1$, $GC_1$, $GA_2$, $GB_2$, $GC_2 \ldots GA_m$, $GB_m$, $GC_m$) from the 3-bit least significant signals ($SA_j$, $SB_j$, $SC_j$) and the first width control signals ($CP_a$, $CP_b$, $CP_c$), and are supplied to the corresponding Y-line driver ($D_1, D_2 \ldots D_m$). The Y-line driver supplies the corresponding Y-line with a Y-line driving pulse corresponding to the video signal. Thus, by combining the various width control signals $CP_a$, $CP_b$, $CP_c$, as shown in FIG. 3, eight brightness levels can be given during the first brightness control period ($t_R$).

TABLE 1

| Quantizing Level | 6-bit Parallel-Coded Video Signal: 3-bit least significant signal SA | SB | SC | 3-bit most significant signal SD | SE | SF |
|---|---|---|---|---|---|---|
| 0 | 0 | 0 | 0 | 0 | 0 | 0 |
| 1 | 1 | 0 | 0 | 0 | 0 | 0 |
| 2 | 0 | 1 | 0 | 0 | 0 | 0 |
| 3 | 1 | 1 | 0 | 0 | 0 | 0 |
| 4 | 0 | 0 | 1 | 0 | 0 | 0 |
| 5 | 1 | 0 | 1 | 0 | 0 | 0 |
| 6 | 0 | 1 | 1 | 0 | 0 | 0 |
| 7 | 1 | 1 | 1 | 0 | 0 | 0 |
| 8 | 0 | 0 | 0 | 1 | 0 | 0 |
| 9 | 1 | 0 | 0 | 1 | 0 | 0 |
| . | . | . | . | . | . | . |
| 16 | 0 | 0 | 0 | 0 | 1 | 0 |
| . | . | . | . | . | . | . |
| 32 | 0 | 0 | 0 | 0 | 0 | 1 |
| . | . | . | . | . | . | . |
| 56 | 0 | 0 | 0 | 1 | 1 | 1 |
| . | . | . | . | . | . | . |
| 63 | 1 | 1 | 1 | 1 | 1 | 1 |

The brightness control in this case is carried out twice during one horizontal line period. The first brightness control period is the time from the end of writing of parallel-coded video signals into the plurality of sets of first memory circuits to the end of the horizontal sweep retrace period shown as "$t_R$" in FIG. 3. The second brightness control period is the remaining time interval of one horizontal line period shown as "$t_s$" in FIG. 3.

On the other hand, 3-bit most significant signals ($SD_j$, $SE_j$, $SF_j$) written into the B set of first memory circuits are still stored there because there is no shift signal from the timing signal generator 5 during the first brightness control period ($t_R$).

At the end of first brightness control period ($t_R$), the set of first switching circuits are now switched to the right terminals in synchronization with the switching signal from the timing signal generator 5. At the same time, by a second set signal generated at the end of the first brightness control period ($t_R$) as shown in FIG. 3, 3-bit most significant signals ($SD_j$, $SE_j$, $SF_j$) in the B set of first memory circuits are simultaneously transferred to the corresponding second memory circuits ($A_1$, $B_1$, $C_1$, $A_2$, $B_2$, $C_2$ . . . $A_m$, $B_m$, $C_m$), and are held there during the second brightness control period ($t_s$) until the next set signal arrives.

The second switching circuit 8 is also switched to the lower terminal immediately after the first brightness control is completed, and the second width control signals ($CP_d$, $CP_e$, $CP_f$) are supplied to the AND gates of the set of brightness control circuits. Therefore, the brightness control signals which are supplied to Y-line drivers are synthesized, in a manner similar to that described above, from 3-bit most significant signals ($SD_j$, $SE_j$, $SF_j$) and the second width control signals ($CP_d$, $CP_e$, $CP_f$).

In this way, Y-line driving pulses are changed two times during one horizontal line period in response to both the sets of width control signals and the parallel-coded video signals held in the set of second memory circuits. Accordingly, the brightness control is carried out in two stages: The first is the control for eight low brightness levels during the first brightness control period ($t_R$), and the second is the control for eight high brightness levels during the remaining time of one horizontal line period. As a result, the scanning apparatus can reproduce half-tone images with a total of 64 brightness levels as shown in FIG. 3.

Consequently, the picture elements along the selected X-line are excited simultaneously by the application of the X-line selecting pulse and the corresponding Y-line driving pulses in response to the video signal. By repeating this operation for every horizontal line period, the picture elements in the whole panel are scanned sequentially line by line from the $X_1$-line to the $X_n$-line. The scanning of the whole panel will be accomplished in such manner.

Because the set of second memory circuits and the AND gates are used in the time sharing mode, they act as parallel 6-bit circuits in spite of the parallel 3-bit circuits configuration. Therefore, the Y-line driving circuit 3 can be greatly simplified.

Although the above discussion has been directed to the use of parallel 6-bit coded video signals and a switching operation involving switching two times, the scope of this invention is not limited to such parallel 6-bit coded video signals or to a switching operation involving switching two times.

Figure 4:
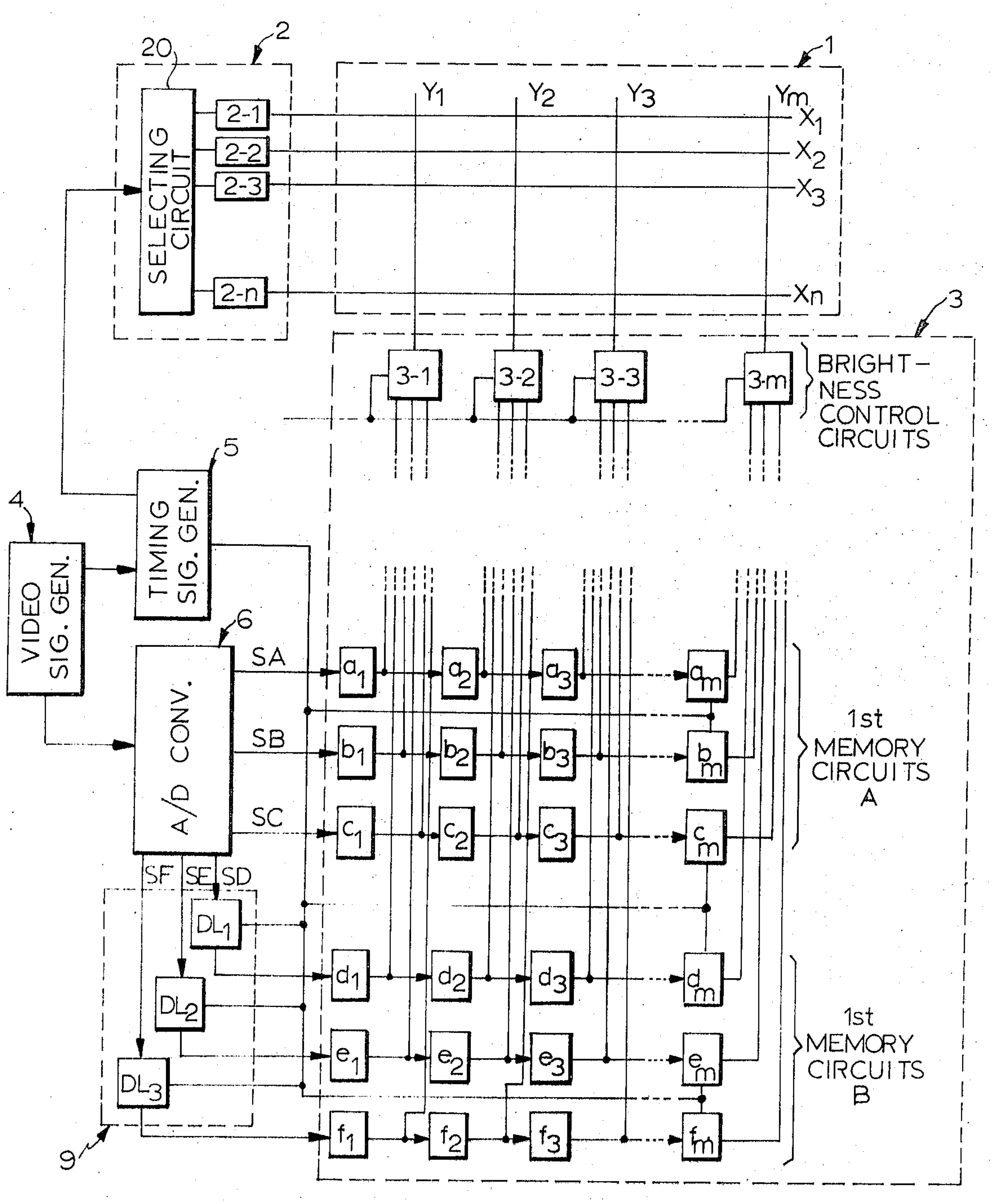
FIG. 4 is a block diagram of another embodiment of the scanning apparatus according to this invention.

FIG. 4 shows another embodiment of the scanning apparatus of this invention which not only can reproduce improved moving, half-tone images but also can increase the brightness of the matrix panel with simple scanning circuitry.

The scanning apparatus shown in FIG. 4 further comprises a set of delay circuits 9 coupled between the analog-to-digital converter 6 and the B set of first memory circuits. For the sake of easy understanding, parallel 6-bit coded video signals are used as the image information signals. In the scanning apparatus shown in FIG. 4, the 3-bit most significant signals (SD, SE, SF) of the 6-bit coded video signals from the analog-to-digital converter 6 are delayed by the set of delay circuits 9 and written into the B set of first memory circuits $d_1$, $e_1$, $f_1$, $d_2$, $e_2$, $f_2$ . . . $d_m$, $e_m$, $f_m$. The other parts of the scanning apparatus are the same as shown in FIG. 1. The X-line driving circuit 2 supplies a plurality of X-line selecting pulses to a plurality of X-line conductors to be scanned during one horizontal line period in response to the delay time of the corresponding delay circuits.

The operation of the scanning apparatus shown in FIG. 4 will be described in conjunction with FIG. 4, FIG. 5 and FIG. 6.

Each bit of the 3-bit most significant signals (SD, SE, SF) is delayed by the set of delay circuits ($DL_1$, $DL_2$, $DL_3$) having different delay times of different integral multiples of one horizontal line period within one field period, for example, delay times of 60H, 120H and 180H, respectively, where "H" is one horizontal line period.

The X-line selecting circuit 20 selects four X-lines during one horizontal line period ($t_x$): One is selected during the horizontal sweep retrace period ($t_R$), and the other three X-lines are selected every one-third of the horizontal active scanning intervals ($t_{s1}$, $t_{s2}$, $t_{s3}$) as shown in FIG. 5. The X-line selecting circuit 20 can be easily constructed from well-known circuits such as flip-flops, shift registers and gate circuits.

Subsequently to the completion of the writing of the 6-bit coded video signals into the sets A and B of first memory circuits, 3-bit least significant signals in the A set of the first memory circuits are transferred simultaneously to the corresponding second memory circuits $A_1$, $B_1$, $C_1$, $A_2$, $B_2$, $C_2$ . . . $A_m$, $B_m$, $C_m$ through the corresponding first switching circuit $SW_1$, $SW_2$ . . . $SW_m$ by the first set signal.

Figure 5:
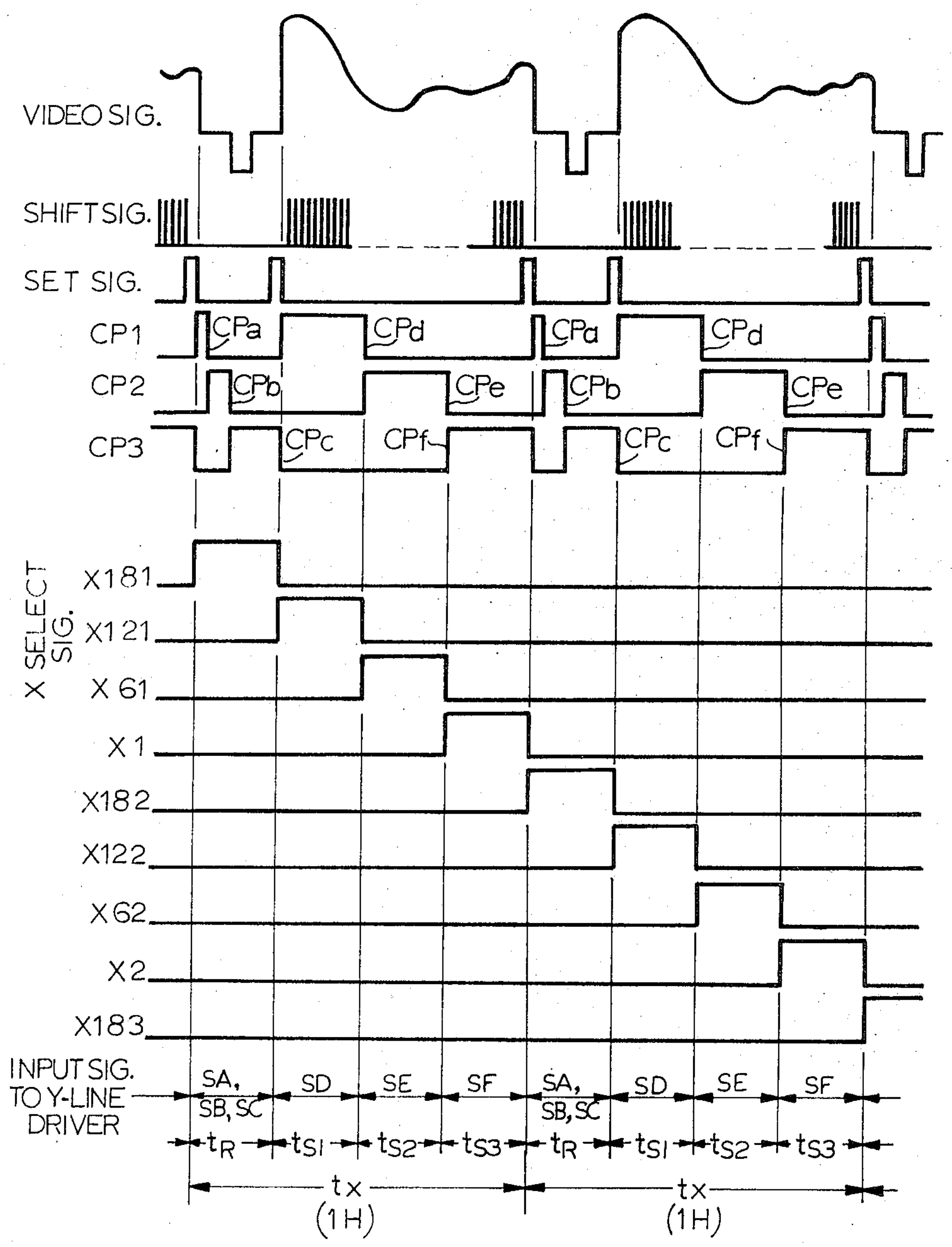
FIG. 5 is a chart showing the relationship, in time, of the of signals for illustrating the operation of the scanning apparatus shown in FIG. 4.
Figure 6:
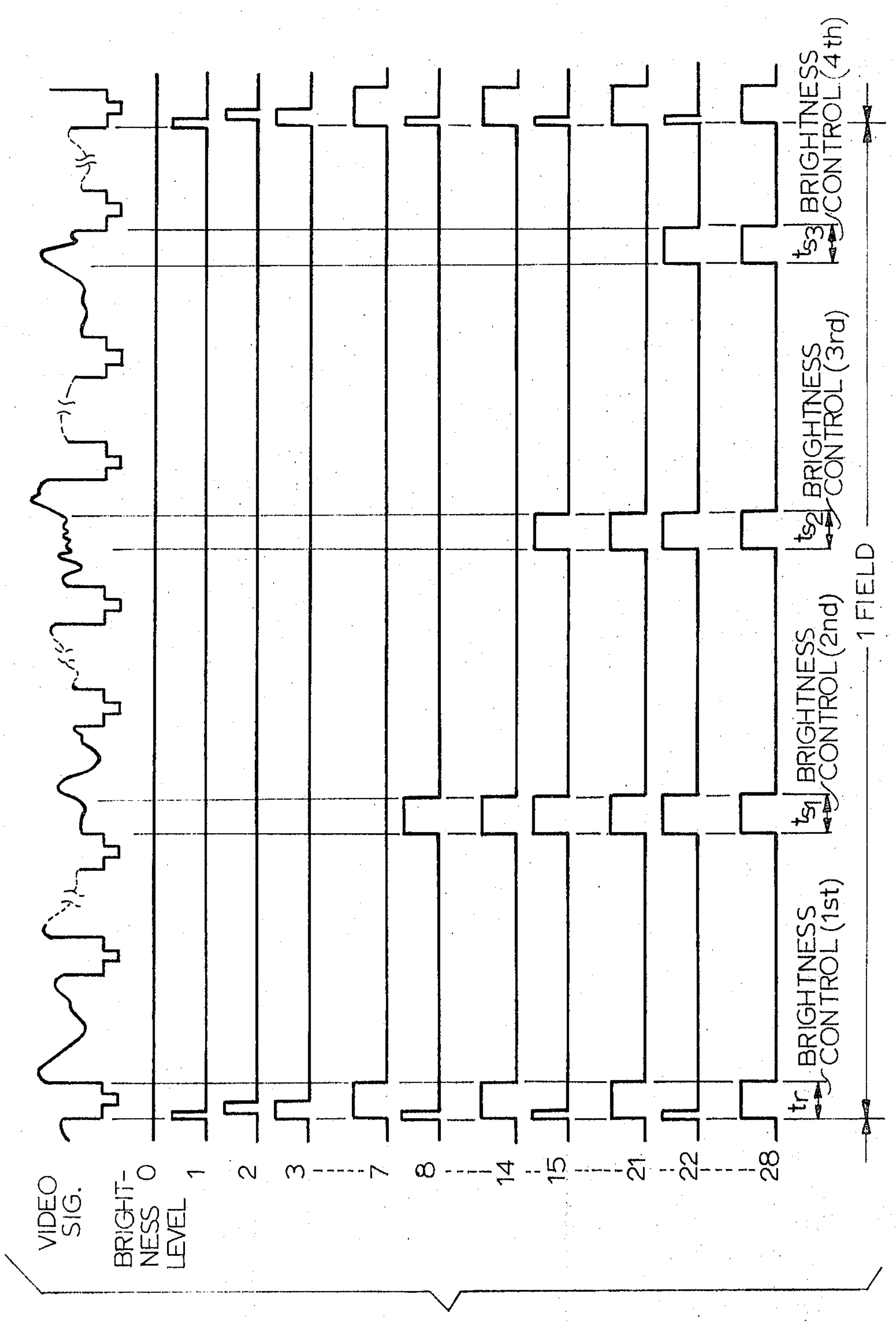
FIG. 6 is a chart which shows the relation between the brightness levels and video signal of the scanning apparatus shown in FIG. 4.

During the horizontal sweep retrace period ($t_R$), the second switching circuit is switched to the upper terminal as shown in FIG. 2, and the first width control signals ($CP_a$, $CP_b$, $CP_c$) shown in FIG. 5 are supplied to the set of brightness control circuits. In the brightness control circuits, the AND gates $GA_1$, $GB_1$, $GC_1$, $GA_2$, $GB_2$, $GC_2$ . . . $GA_m$, $GB_m$ and $GC_m$ synthesize the first brightness control signals and supply them to the Y-line drivers $D_1$, $D_2$ . . . $D_m$ in the same manner as described before.

On the other hand, in the X-line driving circuit 20, just after the time when the writing of the coded video signals corresponding to the 181st X-line ($X_{181}$), for example, into the plurality of sets of first memory circuits is completed, the X-line selecting circuit 20 selects the X-line $X_{181}$. Thus, the first brightness control for the X-line ($X_{181}$) is carried out. The second, third and fourth brightness controls for the X-line ($X_{181}$) are carried out during the horizontal active scanning interval, but at intervals 60H, 120H and 180H after the first brightness control, respectively, as shown in FIG. 6.

Just after the end of the horizontal sweep retrace period ($t_R$), the delayed 3-bit most significant signals of the B set of first memory circuits are transferred simultaneously to the set of second memory circuits $A_1$, $B_1$, $C_1$, $A_2$, $B_2$, $C_2$ . . . $A_m$, $B_m$, $C_m$ through the corresponding first switching circuit $SW_1$, $SW_2$ . . . $SW_m$ by the second set signal.

During the horizontal active scanning interval ($t_{s1} + t_{s2} + t_{s3}$), the second switching circuit is switched to the lower terminal. The second width control signals ($CP_d$, $CP_e$, $CP_f$) are supplied to the brightness control circuits during one-third of the horizontal active scanning interval $t_{s1}$, $t_{s2}$ and $t_{s3}$, respectively. The second width control signals ($CP_d$, $CP_e$, $CP_f$) are not time coincident with each other and have the same pulse width as shown in FIG. 5.

The delayed 3-bit most significant signals ($SD_j$, $SE_j$, $SF_j$) are selected 1 bit at a time by the AND gates $GA_1$, $GB_1$, $GC_1$, $GA_2$, $GB_2$, $GC_2$ . . . $GA_m$, $GB_m$, $GC_m$ in response to the second width control signals ($CP_d$, $CP_e$, $CP_f$).

DUring the first one-third of the horizontal active scanning interval ($t_{s1}$), only one width control signal ($CP_d$) is logical "1." The second brightness control signals for the X-line ($X_{121}$) are synthesized by the corresponding AND gate from the 1-bit of the 3bit most significant signal ($SD_j$) which has been delayed by the interval 60H and the second width control signal ($CP_d$), and are supplied to the corresponding driver.

On the other hand, the corresponding X-line ($X_{121}$) is selected by the X-line selecting circuit 20. Thus the second brightness control for the 121st X-line ($X_{121}$) is carried out during the period ($t_{s1}$).

In the same manner, during the period ($t_{s2}$) the third brightness control signals for the X-line ($X_{61}$) are synthesized by the corresponding AND gate from the 1-bit of the 3-bit most significant signal ($SE_j$) which has been delayed by the interval 120H the second width control signal ($CP_e$). In the X-line selecting circuit 20, the corresponding X-line X(61) is selected.

During the period ($t_{s3}$), the fourth brightness control signals for the X-line ($X_1$) are synthesized by the corresponding AND gate from the 1-bit of the 3-bit most significant signal ($SF_j$) which has been delayed by the interval 180H and the third width control signal ($CP_f$). In the X-line selecting circuit 20, the corresponding X-line ($X_1$) is selected. Similarly, during the next horizontal line period, four X-lines ($X_{182}$, $X_{122}$, $X_{62}$, $X_2$) are selected sequentially by the X-line selecting circuit 20 as shown in FIG. 5. By repeating this operation every horizontal line period, the scanning of the whole matrix panel is completed. Every picture element of the panel can be excited four times during one-field period, and can reproduce half-tone images with 29 brightness levels as shown in FIG. 6.

Consequently, in the scanning apparatus shown in FIG. 4, the set of second memory circuits and the AND gates of the brightness control circuits operate in the time sharing mode. The scanning apparatus can reproduce moving images with 29 half-tone levels although the second memory circuits and the AND gates of the brightness control circuits are in parallel 3-bit configuration.

In the case when a DC-electroluminescent matrix display panel having a DC-electroluminescent layer sandwiched between the X- and Y-line conductors is used as a matrix display panel, the brightness of the panel also can be increased.

The DC-electroluminescent layer can be, for example, composed of copper-coated zinc suphide powder ZnS(Mn, Cu, Cl) embedded in a plastic binder.

The relation between the brightness (L) of such a DC-electroluminescent matrix panel and the pulse width ($P_W$) of the driving pulse at a constant duty ratio can be shown by the equation $L \propto (P_W)^k$, where $k$ is a constant value not more than 1.

The brightness of the DC-electroluminescent matrix panel can be still further increased when the matrix panel is driven a plurality of times with a total driving time of 1H during one-field period rather than a continuous driving time of 1H. If four driving pulses are supplied during one-field period as shown in FIG. 6, the brightness of such DC-electroluminescent matrix panel can be easily doubled, but the increase in the power consumption of the panel is very small because the total driving time during one field period is the same as that for continuous driving.

What we claim is:

1. A scanning apparatus for a matrix display panel having a plurality of picture elements at the intersections of X- and Y-line conductors, said scanning apparatus comprising: an X-line driving circuit coupled to said X-line conductors for supplying X-line selecting pulses to the X-line conductors to be scanned in predetermined sequence; a Y-line driving circuit coupled to said Y-line conductors; a video signal generator for generating video signals; a timing signal generator coupled to said video signal generator, said X-line driving circuit and said Y-line driving circuit; a width control signal generator coupled to said timing signal generator for generating a plurality of sets of width control signals; a second switching circuit coupled between said width control signal generator and said Y-line driving circuit for selecting one of said plurality of sets of width control signals and supplying the width control signals thereof to said Y-line driving circuit; and an analog-to-digital converter coupled between said video signal generator and said Y-line driving circuit for converting said video signals into parallel-coded video signals which are supplied to said Y-line driving circuit, and wherein said Y-line driving circuit comprises: a plurality of sets of first memory circuits for sequentially writing said parallel-coded video signals for one horizontal line period; a set of second memory circuits for holding parallel-coded video signals which are supplied from one of said sets of first memory circuits; a set of first switching circuits coupled between said plurality of sets of first memory circuits and said set of second memory circuits for connecting one of said plurality of sets of first memory circuits at a time to said set of second memory circuits; and a set of brightness control circuits coupled between said second memory circuits and said Y-line conductors for supplying Y-line driving pulses to said Y-line conductors, whereby both of said set of first switching circuits and said second switching circuit are switched a plurality of times during one horizontal line period in synchronization with switching signals from said timing signal generator so that said Y-line driving pulses are changed a plurality of times during one horizontal line period in response to both said sets of width control signals and said parallel-coded video signals held in said set of second memory circuits.

2. A scanning apparatus as claimed in claim 1, wherein said timing signal generator is coupled to both said set of first switching circuits and said second switching circuit and comprises means for generating a switching signal for switching said switching circuits a plurality of times during the time from the end of writing of said parallel-coded video signals into said plurality of sets of first memory circuits to the end of the horizontal sweep retrace period of said video signals.

3. A scanning apparatus as claimed in claim 2, wherein said parallel-coded video signals are composed of least significant signals and most significant signals, said least significant signals being held in said set of second memory circuits during the time from the end of writing of said parallel-coded video signals into said plurality sets of first memory circuits to the end of horizontal sweep retrace period of said video signals, and said most significant signals of said parallel-coded video signals being held in said set of second memory circuits during the remaining time interval of one horizontal line period.

4. A scanning apparatus as claimed in claim 1, wherein said scanning apparatus further comprises a plurality of delay circuits coupled between said analog-to-digital converter and said plurality of sets of first memory circuits which have different delay times from each other which are an integral multiple of one horizontal line period within one field period, some sets of said plurality of sets of first memory circuits being directly coupled to said analog-to-digital converter, the remaining sets of said plurality of sets of first memory circuits are coupled to said analog-to-digital converter through said plurality of delay circuits, whereby said X-line driving circuit supplies a plurality of X-line selecting pulses to a plurality of X-line conductors to be scanned during one horizontal line period in response to the delay time of corresponding delay circuits in synchronization with said switching signals from said timing signal generator.

5. A scanning apparatus as claimed in claim 4 in which said parallel-coded video signals are composed of least significant signals and most significant signals, said some sets of said plurality of sets of first memory circuits into which said least significant signals are written being directly connected to said analog-to-digital converter, and the remainder of said sets of said plurality of sets of first memory circuits being connected to said analog-to-digital converter through said delay circuits, whereby the most significant signals of said parallel-coded video signals are written into the sets of said plurality of sets of first memory circuits through said delay circuits.

* * * * *